United States Patent Office 3,250,756
Patented May 10, 1966

3,250,756
PROCESS FOR PREPARATION OF PHOSPHATE ESTERS OF POLYMERIC MATERIALS CONTAINING HYDROXYL GROUPS
Eduard Bergmeister and Joseph Heckmaier, both of Burghausen, Upper Bavaria, Germany, assignors to Wacker-Chemie G.m.b.H., Munich, Germany, a firm of Germany
No Drawing. Filed Nov. 14, 1961, Ser. No. 152,167
Claims priority, application Germany, Nov. 22, 1960, W 28,966
6 Claims. (Cl. 260—91.3)

This invention relates to a process for the esterification of polymers containing hydroxyl groups with phosphoric acid in a technically simple manner, so that essentially compounds of the general formula $$\begin{array}{c} R-C \\ \phantom{R-}\diagdown \\ \phantom{R-}CH-O-P=O \\ \phantom{R-}\diagup \phantom{CH-O-}| \\ R'-C \phantom{CH-O-}OY' \end{array} \begin{array}{c} \\ OY \\ | \\ \\ \end{array}$$

are formed, wherein Y and Y' represent a water-solubilizing element or radical, such as hydrogen, $NH_4$ or alkali metal, and R and R' represent the two remainders of the polymeric molecule. Of course, in any given polymeric molecule, many repetitions of the above phosphate ester unit will be found.

If the processes of phosphate ester preparation which are customarily employed in organic chemistry, such as reaction with phosphorus oxychloride, are applied to polyvinyl alcohol or cellulose derivatives, a difficultly controllable reaction produces products with a low phosphorus content or, with a higher degree of esterification, cross-linked and discolored products. For the achievement of water-soluble, colorless polyvinyl phosphate, it has further been proposed to heat aqueous mixtures of polyvinyl alcohol and urea phosphate to 130–160° C. until all of the water has been evaporated. During this harsh thermal treatment, not only steam is liberated but also ammonia, so that the very viscous mixture is inflated to many times its original volume. Since the mixture cannot be completely stirred because of its viscosity and the inflating effect even in heavy kneaders, a breakdown of the mixture very readily takes place during the reaction which then leads to non-uniform products with partial cross-linking or to a mixture of polyvinyl phosphates in addition to phosphoric acid salts, such as urea phosphate, amido phosphoric acid and ammonium phosphate. If it is desired to esterify sensitive products by this process, such as polyvinyl alcohol with a hydrolysis degree of 82, that is a copolymer of 18 mol percent vinylacetate and 82 mol percent of vinyl alcohol, substantial saponification takes place because of the presence of water. Moreover, the product forms lumps and must be milled and extracted. Therefore, this process is unsuitable for performance on an industrial scale.

It is an object of the invention to develop a novel process of preparation of phosphoric acid esters of polymers containing hydroxyl groups wherein the polymeric phosphates are obtained in improved form.

It is a further object of the invention to develop a substantially anhydrous method of esterification of polymers containing hydroxyl groups with phosphoric acid.

A further object of the invention is to improve the process of esterifying polymers containing hydroxyl groups with urea phosphate by conducting the same under substantially anhydrous conditions.

These and other objects of the invention will become more apparent as the description thereof proceeds.

The process according to the present invention makes it possible to esterify polymeric substances containing hydroxyl groups with phosphoric acid in a technically acceptable manner. It has surprisingly been found that preparation of phosphate esters according to the invention can lead to homogeneous products even from non-homogeneous systems.

The novel process of the invention consists in reacting polymers containing hydroxyl groups, suspended in a non-aqueous suspension media, with the reaction product of phosphoric acid with urea or its derivatives at elevated temperatures until the desired degree of phosphate ester formation is reached.

Among the polymeric substances containing hydroxyl groups, the following are suitable for use in the process of the invention:

Polyvinyl alcohol and its derivatives, such as partially saponified polyvinyl esters, especially partially saponified polyvinyl acetate, as well as partially acetalyzed or partially ketalized polyvinyl alcohol;

Copolymers of vinyl alcohol with acrylic compounds and methacrylic compounds, such as acrylic acid, methacrylic acid, crotonic acid or maleic acid and/or their derivatives;

Copolymers of vinyl alcohol with other polymerizable compounds, especially vinyl compounds such as ethylene and vinyl chloride;

Cellulose derivatives, especially their water-soluble derivatives such as methyl cellulose, ethyl cellulose and hydroxyethyl cellulose;

Polyglycols, such as high polymeric polyethylene glycols or block polymers of propylene glycol and ethylene glycol, as well as polyglycol adducts. Mixtures of these polymeric substances containing hydroxyl groups may also be used;

Starch and its derivatives.

Suitable non-aqueous suspension media are organic solvents which are only slightly miscible or immiscible with water and which are capable of dissolving urea phosphate, at least at elevated temperatures. Preferable are those organic solvents capable of azeotropic distillation with water with phase separation upon condensation. The polymeric substances containing hydroxyl groups, which are to be esterified in suspension, do not need to be dissolved by the organic solvent; a slight swelling, however, is advantageous. Particularly useful are liquid aromatic hydrocarbons, such as benzene, toluene and other homologs, as well as alkanols having from three to eight carbon atoms, such as propanol, butanol, n-hexanol and mixtures thereof. These suspension agents are advantageously selected in such a way that their boiling point is equal to or higher than the desired reaction temperature for phosphate ester formation.

Suitable agents for phosphate ester formation are the reaction products of phosphoric acid, $H_3PO_4$, with urea and its derivatives, preferably urea phosphate. The ratio of urea to phosphoric acid is preferably a molar ratio of 1:1, but a greater amount of urea may also be used. The preparation is most advantageously effected by admixing concentrated phosphoric acid with urea, for example, in one of the above-mentioned solvents and distilling off the water with benzene or toluene, for instance. The water must be substantially removed, such as 85–95% removed, prior to the addition of the polymer because otherwise the esterification proceeds more slowly and, moreover, does not lead to products having a high degree of phosphate ester groups. On the other hand, dehydration must not be taken too far since the urea phosphate gradually undergoes decomposition, forming an insoluble product which is probably an amido phosphoric acid, upon extensive exposure to high temperatures (120° and above). It is also possible to dehydrate the phosphoric acid alone and to add the urea together with the suspended polymer containing hydroxyl groups.

The reaction temperature employed in the process of phosphate ester formation according to the present invention lies preferably between 70 and 140° C. Within this range, a temperature of 90–120° C. has been found to be particularly advantageous and the reaction proceeds very rapidly. If the temperature is too low the rate of reaction is relatively slow, and if the temperature is too high there is danger of lumping or balling of the normally granular product and also the possibility of cross-linking, especially when a high degree of phosphate ester formation is desired. The reaction is conducted at atmospheric pressure although, if necessary, a superatmospheric pressure or a vacuum may also be applied. A suitable reaction vessel is, for example, a heated vessel provided with a stirrer and having a distillation column provided with a condenser and separator mounted thereon for the purpose of distilling off the water and/or the solvent and removing part of the distillate.

The degree of phosphate ester formation can be controlled by various measures. In order to achieve as high a degree of phosphate ester formation as possible, 1 mol or more of urea phosphate per mol equivalent of the hydroxyl groups of the polymer is employed. If a lower degree of phosphate ester formation is desired, a correspondingly smaller amount of urea phosphate is used. For instance, with a reaction period of ten minutes and a reaction temperature of 115° C., 1 mol of urea phosphate used with 1 mol equivalent of the hydroxyl groups in the polyvinyl alcohol incorporates 13.2% of phosphorus, 0.75 mol of urea phosphate incorporates 9.5% of phosphorus and 0.5 mol of urea phosphate incorporates 7.8% phosphorus. Furthermore, the degree of phosphate ester formation may also be varied by a variation of the reaction period and the reaction temperature within certain limits.

The preferred method of operation is to admix phosphoric acid and urea with a non-aqueous, organic solvent, for example with butanol and a small amount of benzene, and the water is distilled off azeotropically with benzene; thereafter, the benzene is preferably also substantially removed. The reaction is carried out in a heated vessel having an agitator. In the case of butanol, the temperature of the reactants in the vessel under agitation amounts to about 115° C. after distillation of the benzene. The polymer is now added as rapidly as possible in the form of a powder or, better yet, in suspension, for example suspended in butanol, at this temperature. If large quantities of the reaction components are employed, it is advantageous to cool the urea phosphate solution somewhat before adding the polymer and only thereafter heat the reaction mixture again to the reaction temperature. It is, of course, also possible to add the phosphate solution to the polymer suspension. Subsequently, the mixture is maintained at the reaction temperature for ten to sixty minutes accompanied by stirring. The finely granular polymer initially swells somewhat and then transforms rapidly into a more coarsely granular, readily filterable product. The separation of the reaction product may be effected by filtration and washing with a readily volatile non-solvent organic liquid, such as methanol or acetone, or also by decantation of the major amount of the suspension medium, addition of water and subsequent steam distillation to remove final traces of the organic non-aqueous suspension medium. In the latter case an aqueous solution of the raw polyvinyl phosphate is directly obtained, which in most cases may be employed as such.

The advantages of the novel process of the invention reside in that first, it may be performed in vessels having simple stirring devices and secondly, in that the reaction proceeds under mild conditions, whereby the products are not discolored and polyvinyl alcohols with residual ester groups are, in contrast to known processes, saponified only to a minor degree and thirdly, in that products can be obtained which are not cross-linked and are easy to filter and dry.

The properties of the phosphate ester products produced in accordance with the present invention may be utilized in many different ways. They are polymeric esters having acidic groups and they can be cross-linked by heating at elevated temperatures, for example at 150° C. In this manner it is possible to produce resinous materials which act as cation exchangers. By impregnation of fibers such as rayon or cotton, with the polymeric phosphate, the application of basic dyestuffs is enhanced. Furthermore, they are suitable for use as wash resistant and solvent resistant finishing agents for fabrics. Their properties as protective colloids and emulsifiers may be utilized, for example, in the preparation of emulsions, in the emulsion and suspension polymerization of unsaturated compounds such as vinyl compounds or as additives to resin dispersions and the like, with great advantage. The phosphoric acid content of the products increases their thermal stability and reduces their combustibility. Therefore, the polymeric phosphates are suitable for use as flame-resistant impregnations and as flame-resistant additives, for example, to synthetic resin dispersions. Furthermore, the polymeric phosphate may be transformed into metal salts with the aid of metal ions. For instance, if water-soluble salts of calicium or lead are added to an aqueous solution of polyvinyl phosphate, a stable emulsion of the insoluble salt is obtained which may be added to synthetic resin dispersions. The lead salt may also be used as a stabilizer for halogen-containing polymers, such as polyvinyl chloride.

The following examples are illustrative of the invention. They are not, however, to be construed as limiting the invention in any fashion. As is obvious to one skilled in the art, other expedients may be substituted for those specifically described hereinafter.

Example I 60 gm. (1 mol) of urea and 115 gm. of 85% $H_3PO_4$ (1 mol) were admixed with 200 gm. of toluene and 200 gm. of n-hexanol and the resulting mixture was freed from water in the customary manner by azeotropic distillation and separation of the condensed water vapor. Thereafter, 45 gm. of polyvinyl alcohol powder having a degree of hydrolysis of 98 (1 mol equivalent of hydroxyl groups) were added at 120° C. as rapidly as possible, accompanied by thorough stirring. The reaction was interrupted by cooling after ten, twenty, thirty, fifty, sixty and ninety minutes, respectively, in different batches. The granular reaction product in each case was filtered off, washed with acetone and dried. Products with the following properties were obtained:

| Reaction Period | P (percent) | N (percent) | Solubility in Water |
| --- | --- | --- | --- |
| 10 minutes | 15.7 | 6.7 | Colorless, clear. |
| 20 minutes | 17.4 | 7.4 | Do. |
| 30 minutes | 19.7 | 8.1 | Colorless, almost clear. |
| 50 minutes | 19.6 | 9.0 | Colorless, somewhat cloudy (somewhat matted). |
| 60 minutes | 19.2 | 11.8 | Do. |
| 90 minutes | 19.7 | 10.3 | Colorless, cloudy (partly strongly matted). |

From the table it can be observed that after a reaction time of about 30 minutes, no increase in the degree of phosphate ester formation occurred, but with a reaction period of more than 30 minutes, the product became increasingly stronger matted (cross-linked).

Example II 30 gm. (0.5 mol) of urea and 58 gm. of 85% $H_3PO_4$ (0.5 mol) were admixed with 400 gm. of toluene and the mixture was freed from water in the customary fashion. Thereafter, 45 gm. of polyvinyl alcohol with a degree of hydrolysis of 98 (1 mol equivalent of hydroxyl groups) were immediately and rapidly added, accompanied by vigorous stirring. The mixture was maintained for ten minutes at 120° C. In this run only one-half mol of urea phosphate per mol of equivalent of the hydroxyl groups in the polyvinyl alcohol was used. The separation of the reaction product was accomplished as described in Example I. The product obtained thereby contained 7.74% phosphorus and formed a clear solution in water.

*Example III*

60 gm. (1 mol) of urea and 115 gm. of 85% $H_3PO_4$ (1 mol) were admixed with 200 gm. of butanol and 40 gm. of benzene, and the resulting mixture was freed from water in a distillation column; thereafter the benzene was also distilled off. The solution was cooled to about 80° C., and a suspension of 45 gm. of polyvinyl alcohol with a degree of hydrolysis of 98 (1 mol equivalent of hydroxyl groups) in butanol was stirred into the solution. The reaction mixture was then heated to 110° C. and was stirred for ten minutes at this temperature. The product obtained thereby was water-soluble, and the phosphorus content amounted to about 13.2%. If only ½ mol of urea phosphate was used, the resultant product formed a clear solution and had a phosphorus content of 7.8%. If ¾ mol of urea phosphate was used the product had a phosphorus content of 9.5%. If the urea, the phosphoric acid, the butanol and the polyvinyl alcohol were admixed with each other without prior removal of the water and the mixture was heated for twenty minutes at 110° C., a product was obtained which contained only 3.3% phosphorus and stuck together readily to form lumps.

*Example IV*

3.6 kg. of urea and 7 kg. of 85% $H_3PO_4$ were admixed in a vessel with an agitator with 30 kg. of butanol and 10 kg. of benzene, and the resulting mixture was freed from water in a distillation column. Thereafter, the benzene was substantially distilled off; the temperature in the vessel during this time rose to 114° C. In a second agitator-equipped vessel, 5 kg. of polyvinyl alcohol having a degree of hydrolysis of 82% were suspended in 20 kg. of butanol and the suspension was also heated to 114° C. The polyvinyl alcohol suspension was now rapidly allowed to flow into the urea phosphate solution. The urea phosphate was present in an amount of about ⅔ mols per mol equivalent of the hydroxyl groups in the polyinvy alcohol. After a reaction period of twenty minutes at 114° C., the mixture was rapidly cooled while continuing to stir. The granular product was filtered off, washed with acetone and dried. The polyvinyl phosphate thus obtained contained 11.8% phosphorus and 9.4% nitrogen. The saponification of the acetate groups of the partially acetylated polyvinyl alcohol which was employed was only minor. The product formed a virtually clear, homogeneous solution in water.

Instead of filtering off the reaction product, it was also possible to add water and to siphon off the butanol and/or to distill off the butanol by blowing steam into the mixture. After neutralization, if necessary, a solution ready for use was thus obtained directly.

*Example V*

60 gm. of urea and 120 gm. of 85% $H_3PO_4$ were admixed with 200 gm. of butanol and 40 gm. of benzene, and the mixture was freed from water as described in the preceding example; thereafter the benzene was distilled off. 50 gm. of methyl cellulose, suspended in 200 gm. of butanol, were added to this solution at 114° C. and the reaction mixture was allowed to react for twenty minutes accompanied by stirring. The product thus obtained, after recovery, had a phosphorus content of 11% and a nitrogen content of 7.4%. It formed a clear solution in water. The turbidity point of the methyl cellulose increased from 70° C. to about 90° C. by virtue of the phosphate ester formation. The methyl cellulose employed for this example dissolved incompletely in water and remained highly viscous with gelled particles; upon boiling the methyl cellulose partially precipitated out. In contrast thereto, the methyl cellulose phosphate ester formed above gives a true solution with low viscosity which exhibited turbidity, only, upon boiling.

In analogous fashion, a phosphate ester with a content of 3.7% phosphorus and 1.8% nitrogen was obtained when, for example, 20 gm. of urea and 40 gm. of 85% $H_3PO_4$ were used per 67 gm. of hydroxyethyl cellulose.

While we have described specific embodiments of the invention, it will be readily apparent to one skilled in the art that various changes and modifications may be made to these specific embodiments without departing from the spirit of the invention and the scope of the appended claims.

Thus, for example, the urea per se which is preferably employed in the present process, may be replaced by its derivatives, such as methyl urea, n,n- and n,n′-dimethyl urea, ethyl urea, phenyl urea etc.

We claim:

1. A process for the production of phosphate esters of polymeric materials containing hydroxyl groups which comprises the steps of heating a substantially equimolar mixture of phosphoric acid and a urea compound selected from the group consisting of urea, methyl urea, dimethyl urea, ethyl urea and phenyl urea in a liquid, non-aqueous organic solvent selected from the group consisting of aromatic hydrocarbons, alkanols having from three to eight carbon atoms, and mixtures thereof, to a temperature sufficient to remove water therefrom for a period of time sufficient to remove substantially all the water present and to form a urea phosphate solution, adding a polymeric material containing hydroxyl groups selected from the group consisting of a polyvinyl alcohol and water-soluble ethers of cellulose selected from the group consisting of methyl cellulose, ethyl cellulose and hydroxyethyl cellulose, to form a non-aqueous suspension in said urea phosphate solution, heating said non-aqueous suspension at a temperature between about 70° C. and about 140° C. for a time sufficient to effect substantial esterification of said hydroxyl groups and recovering said phosphate esters.

2. The process of claim 1 wherein said polymeric material containing hydroxyl groups selected from the group consisting of a polyvinyl alcohol and water-soluble ethers of cellulose selected from the group consisting of methyl cellulose, ethyl cellulose and hydroxyethyl cellulose is added to said urea phosphate solution in the form of a non-aqueous suspension in a liquid, non-aqueous organic media selected from the group consisting of aromatic hydrocarbons, alkanols having from three to eight carbon atoms, and mixtures thereof.

3. The process of claim 1 wherein said non-aqueous suspension is heated to a temperature between about 90° C. and about 120° C. for a period of from about ten minutes to about ninety minutes.

4. The process of claim 1 wherein about one mol of said urea phosphate is employed for each mol equivalent of hydroxyl groups in said polymeric material containing hydroxyl groups selected from the group consisting of a polyvinyl alcohol and water-soluble ethers of cellulose selected from the group consisting of methyl cellulose, ethyl cellulose and hydroxyethyl cellulose.

5. The process of claim 1 wherein said polymeric material containing hydroxyl groups is a substantially completely saponified polyvinyl alcohol.

6. The process of claim 1 wherein said polymeric material containing hydroxyl groups is methyl cellulose.

References Cited by the Examiner

UNITED STATES PATENTS 2,609,360  9/1952  Daul et al. _____ 260—91.3
3,068,061  12/1962  Johnson et al. _____ 260—91.3

WILLIAM H. SHORT, *Primary Examiner.*

HAROLD N. BURSTEIN, *Examiner.*